United States Patent [19]
Ptak et al.

[11] Patent Number: 6,074,011
[45] Date of Patent: Jun. 13, 2000

[54] AUTOMATIC RETRACTABLE HEAD RESTRAINT

[75] Inventors: Kenneth R. Ptak, Livonia; Anthony J. DiSalvo, Allen Park, both of Mich.

[73] Assignee: Johnson Controls Technology Company, Plymouth, Mich.

[21] Appl. No.: 09/039,822

[22] Filed: Mar. 16, 1998

[51] Int. Cl.$^7$ .............................. A47C 7/36; B60N 2/48
[52] U.S. Cl. ........................................ 297/408; 297/410
[58] Field of Search ................................ 297/408, 403, 297/410

[56] References Cited

U.S. PATENT DOCUMENTS

| | | | |
|---|---|---|---|
| 1,717,568 | 6/1929 | Koenigkramer | 297/403 X |
| 3,157,434 | 11/1964 | Gianvecchio | 297/410 |
| 3,506,306 | 4/1970 | Herzer et al. | 297/408 |
| 3,547,486 | 12/1970 | Herzer et al. . | |
| 3,586,366 | 6/1971 | Patrick | 297/410 X |
| 3,784,253 | 1/1974 | Kohler et al. | 297/410 |
| 3,813,151 | 5/1974 | Cadiou | 297/410 X |
| 3,888,540 | 6/1975 | Protze et al. . | |
| 4,113,310 | 9/1978 | Kapanka . | |
| 4,576,413 | 3/1986 | Hatta . | |
| 4,596,403 | 6/1986 | Dieckmann et al. . | |
| 4,600,240 | 7/1986 | Suman et al. . | |
| 4,623,166 | 11/1986 | Andres et al. . | |
| 4,678,232 | 7/1987 | Ishida et al. | 297/408 |
| 4,711,494 | 12/1987 | Duvenkamp | 297/408 X |
| 4,798,415 | 1/1989 | Tanino et al. | 297/408 X |
| 4,807,934 | 2/1989 | Sakakibara et al. | 297/408 X |
| 4,822,102 | 4/1989 | Duvenkamp . | |
| 4,834,456 | 5/1989 | Barros et al. . | |
| 4,865,388 | 9/1989 | Nemoto . | |
| 5,011,226 | 4/1991 | Ikeda et al. . | |
| 5,222,784 | 6/1993 | Hamelin | 297/408 |
| 5,290,091 | 3/1994 | Dellano et al. | 297/408 X |
| 5,484,189 | 1/1996 | Patterson | 297/408 X |
| 5,590,933 | 1/1997 | Andersson . | |
| 5,738,411 | 4/1998 | Sutton et al. | 297/408 X |
| 5,738,412 | 4/1998 | Aufrere et al. | 297/408 |
| 6,000,760 | 12/1999 | Chung | 297/408 |

FOREIGN PATENT DOCUMENTS

| | | | |
|---|---|---|---|
| 175959 | 4/1986 | European Pat. Off. | 297/408 |
| 1066430 | 10/1959 | Germany | 297/408 |
| 2727987 | 1/1979 | Germany | 297/408 |
| 3136648 | 3/1983 | Germany . | |
| 3129063 | 4/1983 | Germany . | |
| 3325927 | 7/1983 | Germany . | |
| 4026090 | 2/1992 | Germany . | |
| 432747 | 5/1966 | Switzerland | 297/410 |
| 1200627 | 7/1970 | United Kingdom | 297/408 |
| 2034803 | 6/1980 | United Kingdom | 297/408 |

*Primary Examiner*—Peter M. Cuomo
*Assistant Examiner*—David E. Allred
*Attorney, Agent, or Firm*—Harness, Dickey & Pierce, P.L.C.

[57] ABSTRACT

A vehicle seat assembly with a retractable head rest that rotates from an upright use position to a lowered, retracted, stowed position to improve visibility for a vehicle driver. The motion mechanism for the head rest is contained within the body of the head rest itself thus eliminating modification of the seat back to which the head rest is mounted. The head rest is further vertically adjustable relative to the seat back and is rotatably adjustable within a range of upright use positions.

9 Claims, 2 Drawing Sheets

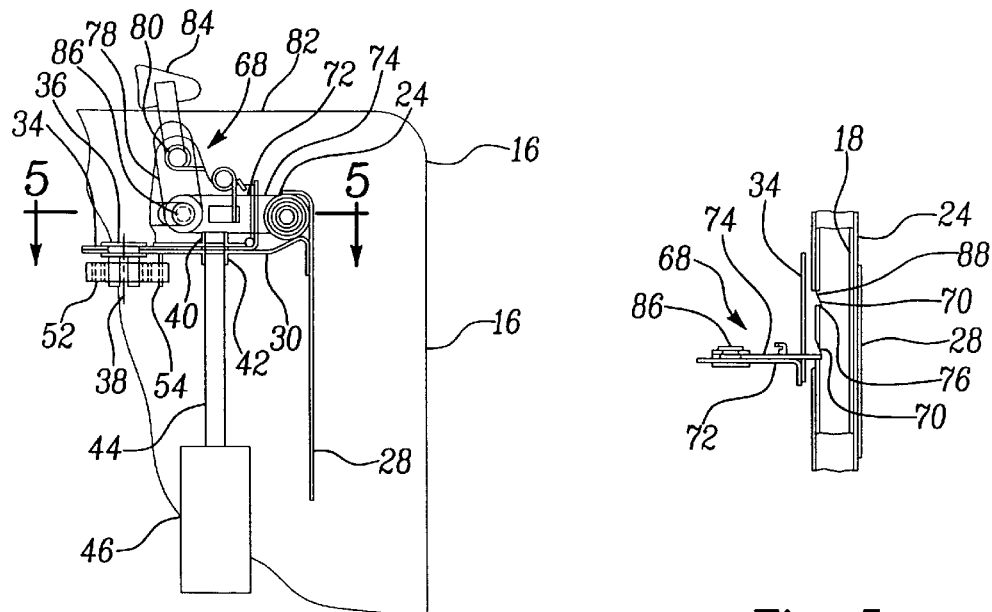
Fig-3
Fig-5
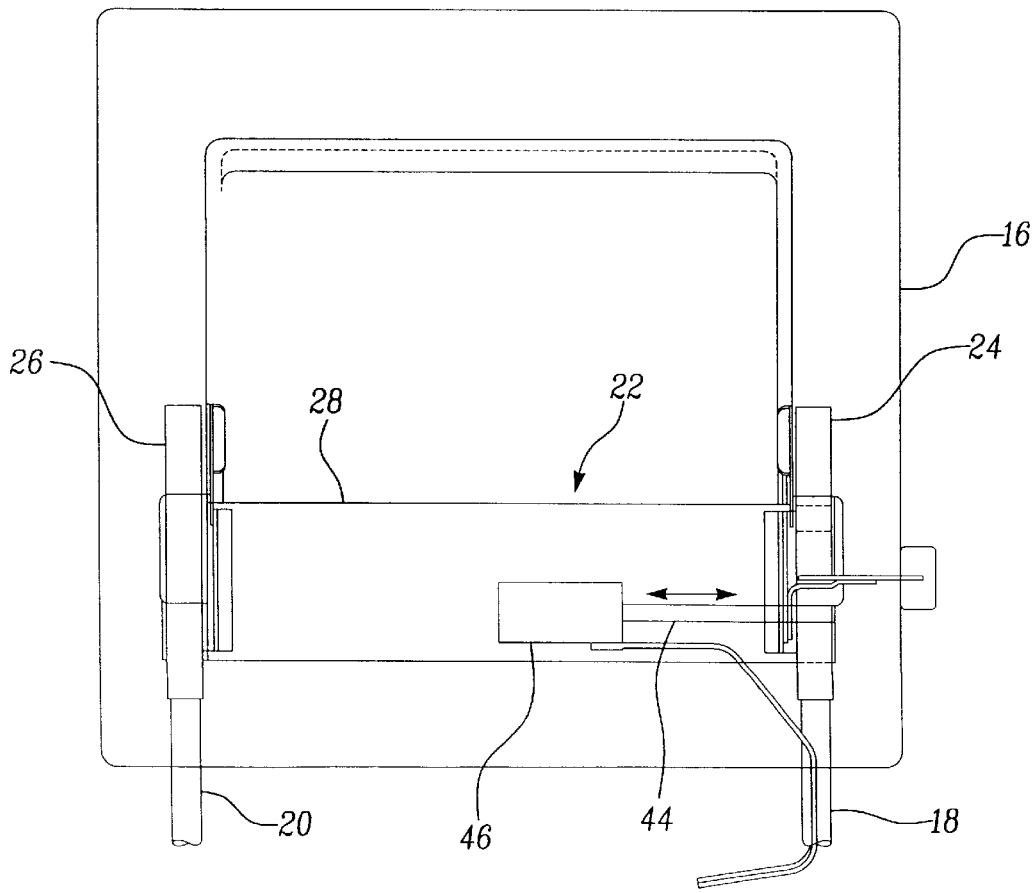
Fig-4

6,074,011

AUTOMATIC RETRACTABLE HEAD RESTRAINT

BACKGROUND AND SUMMARY OF THE INVENTION

The present invention relates to vehicle seats and in particular to a vehicle rear seat with a head restraint that is retractable to reduce the height of the head restraint to improve rearward visibility for the driver.

Seat assemblies with a retractable head rest as described above are generally known as shown in U.S. Pat. No. 5,590,933. A typical arrangement for such seats is to provide a mechanism for rotating the head rest from an upright position to a forwardly rotated stowed position by a mechanism disposed within the seat back. The retracting mechanism is coupled to the head rest posts that extend upward from the upper end of the seat back to mount the head rest. The posts are rotated through an arc of approximately 90° to retract the head rest. This requires slotted openings in the seat cover and in the seat back cushion to enable forward rotation of the posts. To provide such a retracting head rest requires significant modification of the seat back from a conventional seat back that does not have a retractable head rest. The seat back frame may also require revisions.

The seat assembly of the present invention provides a retracting head rest, the mechanism of which is contained within the body at the head rest itself, such that no modification of the seat back is required. The head rest is mounted to fixed posts extending from the seat back. These posts can be mounted to the seat back through the same head rest mounting sleeves used to mount a conventional, non-retracting head rest. The mechanism for rotating the head rest to the retracted position and for latching the head rest in the upright use position is contained within the head rest body. A vertical head rest adjustment mechanism as well as a mechanism for rotatably adjusting the head rest use position are also provided within the head rest body.

Preferably, the head rest can be retracted via a remote actuating switch positioned close to the vehicle driver seat. This enables the driver, while driving the vehicle, to retract the head rest when needed to improve visibility when the rear seat is not occupied. Preferably, the head rest is retracted by rotating forwardly and downwardly such that it extends forward from the front surface of the seat back. In this position, it will be noticeably out of position such that a subsequent seat occupant will be alerted to the need to return the head rest to its use position.

An advantage of the retractable head rest of the present invention is that the same seat back can be used in a vehicle sold where a retracting head rest is required to meet local requirements and sold in a country where such a retracting head rest is not required. Only minimal modification of the seat back is necessary, that being the provision of a wire, cable, etc., through the seat back to actuate the retracting head rest. The seat back frame, cushion, and front cover are unchanged.

Further objects, features and advantages of the invention will become apparent from a consideration of the following description and the appended claims when taken in connection with the accompanying drawings.

BRIEF DESCRIPTION OF THE DRAWINGS

FIG. 3 is a bottom view of the retracting mechanism as seen from the arrow 3 in FIG. 2;

FIG. 4 is a front view of the retracting mechanism; and

FIG. 5 is a sectional view of the latch mechanism for the vertical adjustment of the head rest as seen from substantially the line 5—5 of FIG. 3.

DETAILED DESCRIPTION OF THE PREFERRED EMBODIMENT

Figure 1:
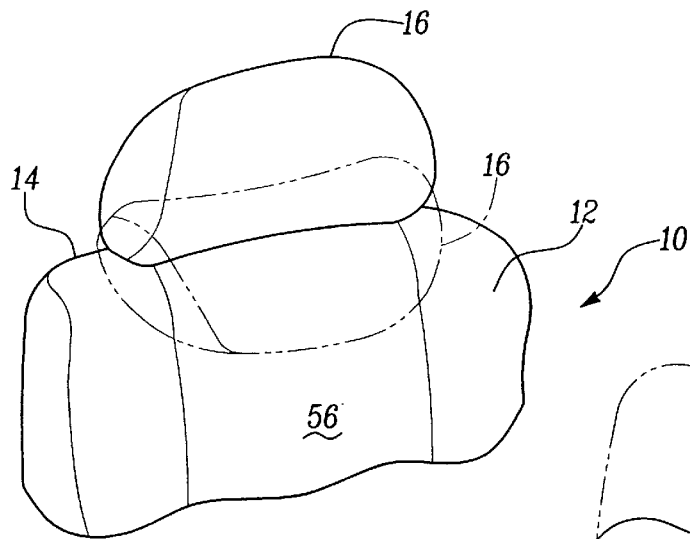
FIG. 1 is a perspective view of a seat back having the retractable head rest of the present invention.

The seat assembly having a retracting head rest according to the present invention is shown in FIG. 1 and designated generally at 10. Seat assembly 10 includes a generally upright seat back 12 having an upper end 14. A head rest 16 is mounted at the upper end of the seat back and extends upwardly therefrom in a use position shown in solid line in FIG. 1. The head rest 16 is retractable to a forwardly rotated stowed position shown in phantom line in FIG. 1. This reduces the height of the obstruction caused by the head rest to improve rearward visibility for a front seat driver. While the invention is shown in the context of a rear bench seat in a motor vehicle, it could also be employed in a front passenger seat or all rear seats in a van or sport utility vehicle. The head rest 16 includes a three-dimensional body having an interior volume. The body is typically padded to provide comfort and protection for a seat occupant. It is within the interior volume of the head rest 16 that the mechanism for retracting the head rest, vertically adjusting the head rest and rotating the head rest within a range of upright use positions for the comfort of a seat occupant resides.

The head rest 16 is mounted to the posts 18, 20 that are fixed in position relative to the seat back. While two posts are illustrated, the invention can be carried out with only one post if desired. The posts 18, 20 are mounted into the seat back using a conventional head rest post mounting mechanism as is well known. Preferably, the posts are not vertically adjustable relative to the seat back, but instead are fixed in position. The head rest includes an internal frame 22 which includes, among other things tubes 24, 26 mounted on and surrounding the posts 18, 20, respectively. The tubes 24, 26 move vertically along the posts as is described in greater detail below. A cross bar 28 is joined to two tubes 24, 26 and spans across the head rest. The frame 22 further includes forwardly extending brackets 30 fixed to the tube 24, 26. The tubes 24, 26, cross bar 28 and brackets 30 of the frame 22 only move vertically along the posts 18, 20. These frame components do not rotate when the head rest is rotated to the retracted position or when it is adjusted rotationally within its use position. A rotating frame portion 32 includes pivot brackets 34 that are rotatably attached to the brackets 30 at the pivot 36. The pivot 36 defines a first pivot axis 38 about which the rotating frame portion rotates when the head rest is retracted to the stowed position.

The pivot bracket includes an aperture 40 which, when the head rest is in its upright use position, aligns with an aperture 42 in the bracket 30. A latch pin 44 extends through the two apertures 40, 42 to hold the pivot bracket, and thus the head rest, in the upright use position. In the embodiment shown, the latch pin 44 is the rod of a solenoid 46. When the pin 44 is extended through the two apertures, the head rest is held in the upright use position. The solenoid is coupled to an actuating switch 48 via a wire 50. The switch 48 is preferably located within easy reach of the vehicle driver, at a location remote to the head rest 16. This enables the driver, while driving the vehicle and noting that his/her visibility is reduced by the head rest, to retract the head rest to a lower position by actuating the switch 48. This withdraws the pin 44 from the aperture 40 in the pivot bracket. The seat preferably includes an occupant sensor to prevent retraction of the head rest when the seat is occupied.

Other mechanisms besides the solenoid 46 can be used to retract the latch pin 44. These include an electric motor, a cable, Bowden cable, rope, mechanical linkage, hydraulics, pneumatics, etc. The particular mechanism for removing the latch pin is not essential to the present invention. It is preferred that the mechanism be remotely actuatable and that it also be relatively small for packaging within the head rest 16.

The pivot 36 has a split shaft for receiving one end of clock spring 52. The other end of the clock spring is anchored on a bent up tab 54 on the bracket 30. The clock spring 52 is arranged to provide the moving forced to rotate the head rest to the retracted position once the latch pin 44 has been released upon actuation of the switch 48. When the seat assembly 10 is subsequently occupied, the seat occupant must manually lift the head rest to the use position. By rotating the head rest forward and downward, the head rest extends forward of the seat back front surface 56 and intrudes into the upper back, neck or head region of the occupant, thus providing an obvious clue that the head rest needs to be repositioned. It will be readily appreciated that the head rest could be rotated rearward as opposed to forward, if desired, by merely reversing the components from their positions shown in the drawings.

Figure 2:
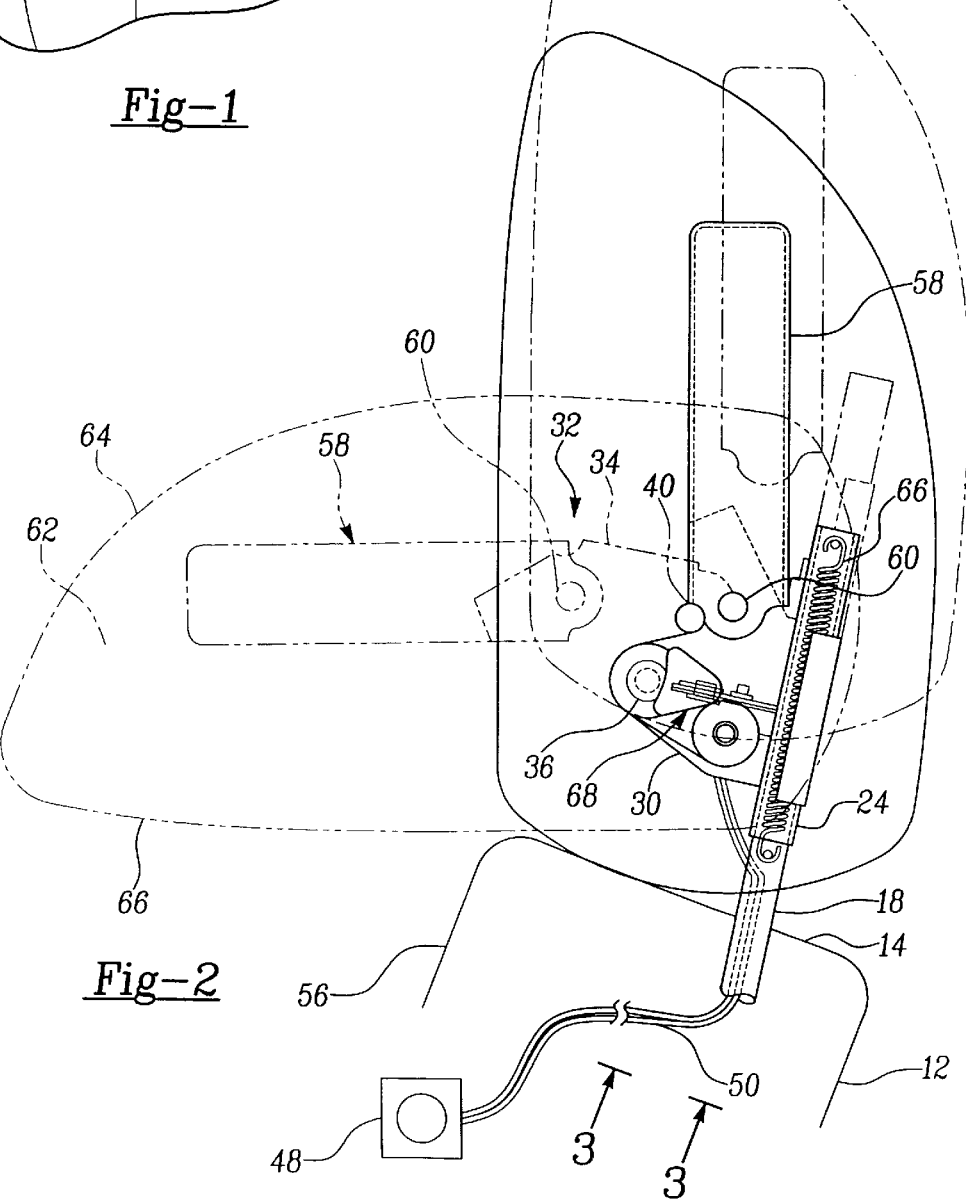
FIG. 2 is a side view of the retracting mechanism in the head rest.

A second rotating frame portion 58 is pivotally mounted to the pivot bracket 34 by the pivot 60. The resilient pad 62 and trim cover 64 of the head rest 16 are carried by the frame portion 58. By rotating the frame portion about the pivot 60, the head rest is rotatably adjustable within a range of generally upright use positions for the comfort of the seat occupant. The pivot 60 defines a second transverse axis, generally parallel to the axis 38 of pivot 36. When the head rest is retracted to the stowed position, the head rest will first rotate about the pivot 36. When the front face 66 of the head rest contacts the upper end of the seat back, this will urge the head rest to rotate clockwise about the pivot 60 relative to the pivot bracket 34 as the pivot bracket 34 continues to rotate counter clockwise, as viewed in FIG. 2, to the retracted position. As a result, the relative positions of the frame portion 58 to the pivot bracket 34, when the head rest is retracted, will be the rearward most adjusted position of the head rest.

The tubes 24, 26 are movable longitudinally along the posts 18, 20 to vertically adjust the position of the head rest relative to the seat back. A spring 66 urges the head rest to the lower most adjusted position. A latch mechanism 68 holds the head rest in the adjusted position. With reference to FIG. 5, it is shown that the tube 18 has a plurality of detent notches 70. A bracket 72 carried by the pivot bracket 34 slidably supports a latch pin or slider 74 that is seated within the detent notches 70 and rests against the generally flat lower edge 76 of the detent notch. This holds the head rest in place and prevents downward movement as urged by the spring 66.

A release lever 78 is pivotally mounted to the bracket 72 by pivot 80 and extends outward beyond the side surface 82 of the head rest 16. A handle or knob 84 is placed on the release lever. The other end of the release lever is pivotally connected to the latch pin 74 at the pivot 86. Upon movement of the handle 84 to the right, as viewed in FIG. 3, the latch pin 74 is retracted from the detent notch 70 allowing the head rest to be lowered.

The upper surface 88 of the detent 70 is a curved or sloped. This surface drives the latch pin 74 out of the detent as the head rest is manually raised. This enables the head rest to be moved upward without actuation of the latch 68. The latch 68 only needs to be actuated to lower the head rest height. If desired, the connection between the latch pin 74 and release lever 78 can include a slot forming a lost motion mechanism enabling the latch pin 74 to be retracted from the notch for lifting of the head rest without causing movement of the release lever. In such an embodiment, two latch return springs are provided, a latch spring 90 to return the latch pin 74 to its latched position and a release lever return spring 92 to return the release lever 78 to its latched position.

Since the latch 68 is carried by the pivot bracket 34, when the head rest is retracted, the latch pin 74 is rotated out of the detent. This results in the head rest being lowered to its lower most vertical position upon movement to its stowed position. The upper surface 88 of the detents 70 in the posts are curved or sloped to allow the latch pin 74 to rotate upward and out of the detent as the head rest rotates about the axis 38.

The present invention thus provides a head rest that is mounted to a fixed post extending from the upper end of a seat back and which is movable relative to the seat back. The head rest is movable vertically relative to the seat back to adjust the height of the head rest. The head rest is also rotatable about a transverse axis within a range of use positions. The head rest is further rotatable to a retracted, stowed position to lower the head rest to reduce the overall height to improve visibility for a vehicle driver.

It is to be understood that the invention is not limited to the exact construction illustrated and described above, but that various changes and modifications may be made without departing from the spirit and scope of the invention as defined in the following claims.

What is claimed is:

1. A vehicle seat assembly comprising:

a seat back having an upper end;

at least one mounting post extending generally upwardly from the upper end of the seat back and being coupled to the seat back;

a head rest having a three dimensional body defining an interior volume mounted to the post;

first rotating means within the interior volume of the head rest for rotating the head rest relative to the post about a first axis between a use position and a stowed position; and second rotating means within the interior volume of the headrest for rotating the head rest relative to the post about a second axis within a range of use positions for the comfort of a seat occupant, wherein the first axis and the second axis are transverse to a normal forward and rearward direction of the seat assembly.

2. The vehicle seat assembly of claim 1 further comprising means for vertically moving the first axis and the second axis relative to the post to raise and lower the head rest for the comfort of a seat occupant.

3. A vehicle seat assembly comprising:

a seat back having an upper end;

at least one mounting post coupled to and extending generally upwardly from the upper end of the seat back;

a bracket supported by the post and movable along a length of the post;

a head rest having an upper portion and a three dimensional body defining an interior volume mounted to the bracket by a pivot for rotation about a first axis between a use position and a stowed position, the first axis being transverse to a normal forward and rearward direction of the seat assembly, the upper portion of the head rest being displaced in a forward and downward direction in the stowed position relative to the use position to improve rearward visibility;

first latch means within the head rest interior volume for holding the head rest in one of the use and stowed positions when the first latch means is engaged;

bias means within the head rest interior volume for urging the head rest primarily in a plane perpendicular to the first axis into the other one of the use and stowed positions when the first latch means is released; and second latch means for selectively holding the bracket in a position along the post when the second latch means is engaged wherein the position of the head rest relative to the upper end of the seat back is vertically adjusted by moving the bracket along the length of the post.

4. The vehicle seat assembly of claim 3 further comprising release means operably associated with the first latch means for releasing the first latch means from a location spaced from the head rest.

5. The vehicle seat assembly of claim 4 wherein the release means includes a solenoid within the head rest interior volume and an actuation switch operably associated with the solenoid for actuating the solenoid from a location spaced from the head rest.

6. The vehicle seat assembly of claim 3 further comprising means for rotating the head rest about a second axis within a range of use positions, the second axis being transverse to a normal forward and rearward direction of the seat assembly.

7. The vehicle seat assembly of claim 3 wherein the first latch means holds the head rest in the use position by holding the head rest fixed relative to the bracket and the bias means urges the head rest to the stowed position and further comprising release means operably associated with the first latch means for releasing the first latch means from a location spaced from the head rest.

8. A vehicle seat assembly comprising:

a seat back having an upper end;

at least one mounting post coupled to and extending generally upwardly from the upper end of the seat back;

a bracket supported by the post and movable along a length of the post;

a head rest having a three dimensional body defining an interior volume mounted to the bracket by a pivot for rotation about a first axis between a use position and a stowed position, the first axis being transverse to a normal forward and rearward direction of the seat assembly;

first latch means within the head rest interior volume for holding the head rest in one of the use and stowed positions when the first latch means is engaged;

bias means within the head rest interior volume for urging the head rest into the other one of the use and stowed positions when the first latch means is released;

second latch means for selectively holding the bracket in a position along the post when the second latch means is engaged wherein the position of the head rest relative to the upper end of the seat back is vertically adjusted by moving the bracket along the length of the post; and second bias means for urging the head rest to a lowermost position along the post.

9. The vehicle seat assembly of claim 8 wherein the second latch means is operably associated with the bracket such that the second latch means is released upon rotation of the bracket and movement of the head rest from the use position to the stowed position whereby the head rest is moved to the lowermost position along the post when the head rest is rotated to the stowed position.

* * * * *